United States Patent
Syed et al.

(10) Patent No.: US 11,705,966 B2
(45) Date of Patent: Jul. 18, 2023

(54) FRAMEWORK FOR HANDLING SIGNAL INTEGRITY USING ASE IN OPTICAL NETWORKS

(71) Applicant: Infinera Corporation, San Jose, CA (US)

(72) Inventors: Sharfuddin Syed, San Jose, CA (US); Ashwini K. Bhat, Bangalore (IN); Vasudha Bhaskara, Milpitas, CA (US)

(73) Assignee: Infinera Corporation, San Jose, CA (US)

(*) Notice: Subject to any disclaimer, the term of this patent is extended or adjusted under 35 U.S.C. 154(b) by 0 days.

(21) Appl. No.: 17/561,842

(22) Filed: Dec. 24, 2021

(65) Prior Publication Data
US 2022/0123834 A1    Apr. 21, 2022

Related U.S. Application Data

(62) Division of application No. 16/827,582, filed on Mar. 23, 2020, now Pat. No. 11,336,369.

(60) Provisional application No. 62/822,489, filed on Mar. 22, 2019.

(51) Int. Cl.
*H04B 10/079*    (2013.01)

(52) U.S. Cl.
CPC ..... *H04B 10/0793* (2013.01); *H04B 10/0799* (2013.01); *H04B 10/07955* (2013.01); *H04B 10/07957* (2013.01)

(58) Field of Classification Search
None
See application file for complete search history.

(56) References Cited

U.S. PATENT DOCUMENTS

| | | | | |
|---|---|---|---|---|
| 5,239,607 A * | 8/1993 | da Silva | ........... | H01S 3/1302 359/347 |
| 6,515,777 B1 * | 2/2003 | Arnold | ........... | H04J 14/0221 359/337 |
| 2003/0185563 A1 * | 10/2003 | Stephens | ........... | H04B 10/296 359/25 |
| 2014/0160919 A1 * | 6/2014 | Kar | ........... | H04L 45/28 370/220 |
| 2018/0278361 A1 * | 9/2018 | Nakata | ........... | H04J 14/0221 |

* cited by examiner

*Primary Examiner* — Darren E Wolf
(74) *Attorney, Agent, or Firm* — David L. Soltz (57) ABSTRACT

A method and system is described. A signal indicative of a failure of a first channel within a plurality of channels of a transmission signal traversing a signal working path in a network is received. The signal working path has a headend node, a tail-end node and an intermediate node. The first channel has a frequency band and a power level prior to failing. The signal working path is associated with a protection path. The protection path includes the intermediate node, optical cross-connects, and a transmitter supplying (ASE) light. The transmitter is activated to supply the ASE light within a frequency band and having a power level corresponding to the frequency band and power level associated with the first channel. The ASE light is supplied to a cross-connect, such that the cross-connect provides a transmission signal including the ASE light.

10 Claims, 7 Drawing Sheets

FRAMEWORK FOR HANDLING SIGNAL INTEGRITY USING ASE IN OPTICAL NETWORKS

INCORPORATION BY REFERENCE

The present patent application is a divisional of U.S. Ser. No. 16/827,582, filed Mar. 23, 2020, which claims priority to the provisional patent application identified by U.S. Ser. No. 62/822,489, filed on Mar. 22, 2019, the entire content of which is hereby incorporated herein by reference.

BACKGROUND

Optical networking is a communication means that utilizes signals encoded in light to transmit information in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wave division multiplexing to enable high-bandwidth, transcontinental communication.

Optical networks include both free-space optical networks and fiber optic networks. Free-space networks transmit signals across open space without the use of a specific medium for the light. An example of a free-space optical network includes Starlink by SpaceX. A fiber-optic network, however, utilizes fiber optic cables made of glass fiber to carry the light through a network.

The signal traversing the fiber optic cable (optical signal) carries one or more data channel within an optical signal wavelength. If a channel fails, that is, if a portion of the optical signal wavelength having a channel has an unexpected power loss, a power transient may be formed that is amplified based on the number of line spans between terminals. The power transient may cause one or more of the channels on the optical signal to become unreadable or may prevent the optical signal from carrying all data to an end terminal. Further, the power transient may lead to signal degradation that cannot be corrected, thereby causing the existing channels to fail to maintain the signal until the next power control cycle, which may be hundreds of seconds later.

Thus, a need exists for a system and method that maintains existing media channels that are operational in the event that multiple media channels that are inoperable fail. It is to such a system and method that the present disclosure is directed.

SUMMARY

The problem of maintaining operational media channels in a transmission signal in the event that multiple media channels that are inoperable fail, is addressed by associating a signal working path with an ASE protection path to form a protection group in which optical cross-connects for the signal working path for the media channels within the transmission signal are pre-established for frequency bands within the ASE protection path, the ASE protection path having a headend node, a tailend node, and an intermediate node, the ASE protection path identifying one or more ASE transmitter to supply ASE light having a frequency band and power level to match the frequency band and power level of the media channels. Upon detection of a failure of the media channels within the protection group, the ASE transmitter is activated to supply ASE light into the transmission signal within a frequency band and power matching the failed media channels in the protection group so as to maintain operational channels within the transmission signal.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description and should not be regarded as limiting.

As used in the description herein, the terms "comprises," "comprising," "includes," "including," "has," "having," or any other variations thereof, are intended to cover a nonexclusive inclusion. For example, unless otherwise noted, a process, method, article, or apparatus that comprises a list of elements is not necessarily limited to only those elements but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order of importance to one item over another.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

A reconfigurable add-drop multiplexer (ROADM) node is an all-optical subsystem that enables remote configuration of wavelengths at any ROADM node. A ROADM is software-provisionable so that a network operator can choose whether a wavelength is added, dropped, or passed through the ROADM node. The technologies used within the ROADM node include wavelength blocking, planar lightwave circuit (PLC), and wavelength selective switching (WSS)—though the WSS has become the dominant technology. A ROADM system is a metro/regional WDM or long-haul DWDM system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

An Optical Cross-Connect is a device for switching at least a portion of a spectrum of light in an optical signal received on an input optical port to any (one or more) output optical port. An optical cross-connect can be configured on ROADM network elements, with a built in wavelength selective switch (WSS) component that is used to route an optical signal in any of the fiber degree or direction. For example, an exemplary optical cross connect can be formed within a wavelength selective switch by opening a specified channel, or specific spectrum of light on an input port of the wavelength selective switch. Configuring or pre-configuring an optical cross-connect may be accomplished by providing instructions to a device to cause the device to switch at least a portion of a spectrum of light in an optical signal received on an input port to any (one or more) output optical port.

The methods and systems herein disclosed may be used in optical networks. In one embodiment, the optical network has one or more band, or portion of wavelength. As used herein, the C-Band is a band of light having a wavelength between 1528.6 nm and 1566.9 nm. The L-Band is a band of light having a wavelength between 1569.2 nm and 1609.6 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, a span is the spread or extent of a fiber optic cable between the fiber optic cables' terminals. Generally, a span is an unbroken or uninterrupted segment of fiber optic cable between amplifiers. For instance, if a fiber optic cable carried a signal from point A through a repeater or amplifier at point B and on to point C, the fiber optic cable is said to have two spans, a first span from A to B, and a second span from B to C, the length of the spans being the distance between the respective points. A span may also be the distance between amplifiers, even if the fiber optic cable has not been terminated. For example, the fiber optic cable may not be terminated at an optical in-line amplifier (described in detail below).

As used herein, a transmission line segment is the portion of a transmission line from a first node (e.g., ROADM) transmitting a transmission signal to a second node (e.g., ROADM) receiving the transmission signal. The transmission line segment may include one or more optical in-line amplifier situated between the first node and the second node.

Amplified spontaneous emission (ASE) is light produced by spontaneous emission that has been optically amplified by the process of stimulated emission in a gain medium. ASE is an incoherent effect of pumping a laser gain medium to produce a transmission signal. If an amplified spontaneous emission power level is too high relative to the transmission signal power level, the transmission signal in the fiber optic cable will be unreadable due to the low signal to noise ratio.

Raman scattering, also known as spontaneous Raman scattering, is an inelastic scattering of photons by matter, that is, the direction and energy of the light changes due to an exchange of energy between photons and the medium. Inelastic scattering is a fundamental scattering process in which the kinetic energy of an incident particle is not conserved. Stimulated Raman scattering (SRS) takes place when a signal light interacts in a medium with a pump light (light source or original light), which increases the Raman-scattering rate beyond spontaneous Raman scattering. Signal-Signal Stimulated Raman Scattering is Raman scattering caused by the injection of two or more signal lights into a light stream. Raman gain, also known as Raman amplification, is based on stimulated Raman scattering wherein a lower frequency photon induces the inelastic scattering of a higher-frequency photon in an optical medium.

As used herein, gain is a process wherein the medium on which a transmission signal is traveling transfers part of its energy to the emitted signal, in this case the transmission signal, thereby resulting in an increase in optical power. In other words, gain is a type of amplification of the transmission signal.

As used herein, tilt, also called linear power tilt, is defined as the linear change in power with wavelength over the signal spectrum. Due to Raman gain, short wavelength signals provide Raman gain for longer wavelengths. SRS Tilt strength, that is the difference in gain between the longest wavelength and the shortest wavelength of the signals, depends on the transmission signal power, spectral loading, fiber type, and fiber length. As used herein, the tilt arises from power that is depleted from shorter wavelength signals to amplify longer wavelength signals.

Spectral loading, or channel loading, is the addition of one or more channel to a specific spectrum of light described by the light's wavelength in a transmission signal. When all channels within a specific spectrum are being utilized, the specific spectrum is described as fully loaded. A grouping of one or more channels may be called a media channel. Spectral loading may also be described as the addition of one or more media channel to a specific spectrum of light described by the light's wavelength to be supplied onto the optical fiber as the transmission signal.

A superchannel, as used herein, is a predetermined grouping of multiple media channels having specific spectrums of light that are routed through the optical network together. In some embodiments, the superchannel is routed through the optical network as a signal working path.

Line amplifier dynamics (i.e., EDFA, Raman) and interactions in optical fiber (Signal-Signal Raman gain, etc.) are likely to change based on spectral loading changes (such as number of optical channels in the fiber optic cable and/or the wavelength of the present optical channels, etc.) In other words, amplifier and optical fiber dynamics differ when the wavelength of the optical signals, or optical carriers, for existing optical channels change and this causes changes in the tilt.

The present disclosure provides a system that compensates for additions or removal of one or more optical carriers into the transmitted optical signal power spectrum by loading spectral band not used for communicating data with idler carriers providing optical power matching of the power of data carrying optical signal carriers (e.g., similar average power spectral density as the optical carriers) at specific frequencies within the spectral band without data imposed. This permits dynamic changes in the loading conditions of the optical fiber, without substantially effecting the data transmission of existing data carrying channels. In the event of a failure of predetermined groups of channels within the optical signal, the disclosure describes how to automatically replace the predetermined groups of channels with ASE light to minimize any change to the data transmission of existing data carrying channels. This way the signal loading changes are automatically handled such that the fiber's spectral loading is reverted back to optimal and/or minimally affected.

Figure 1:
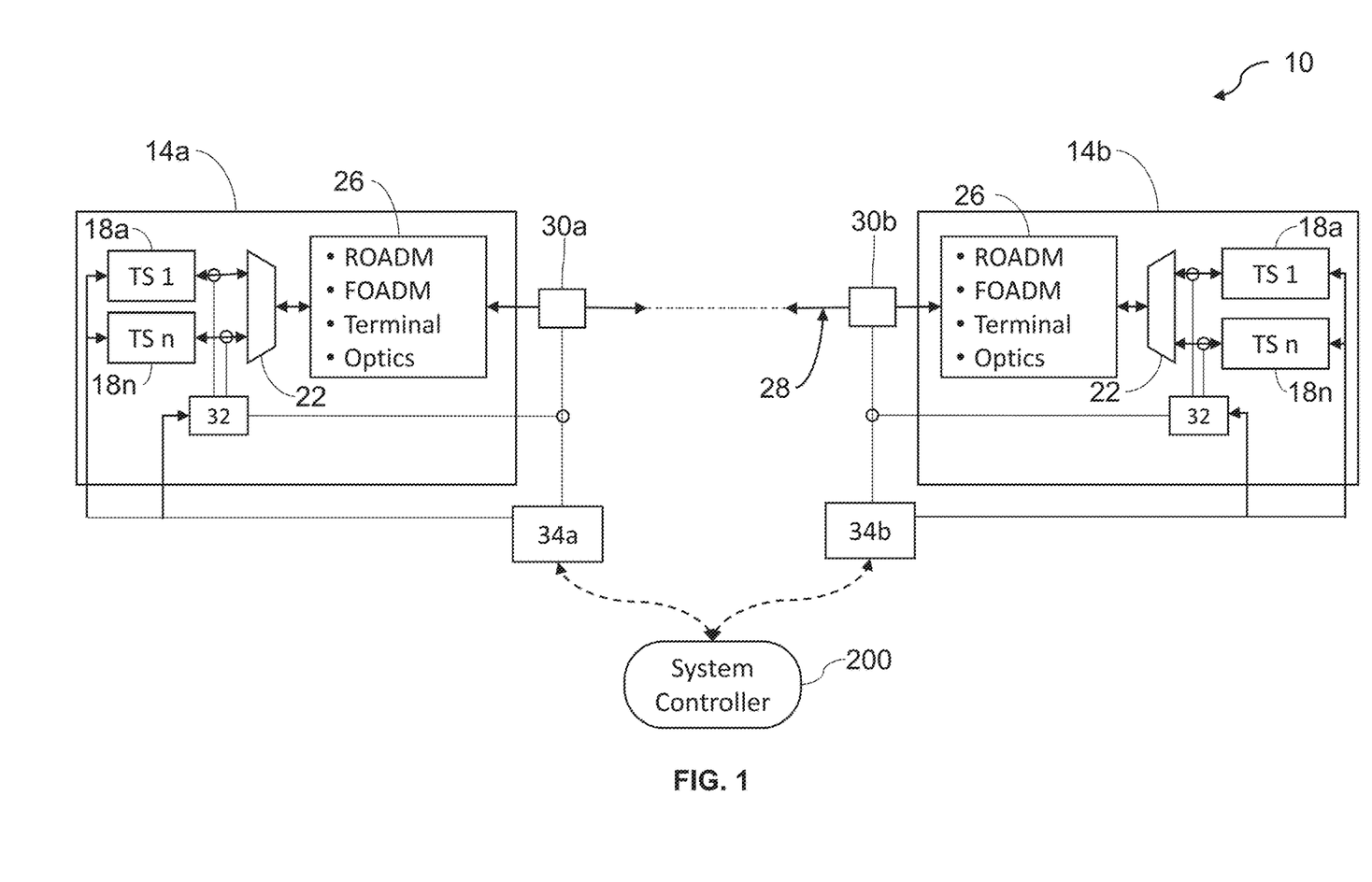
FIG. 1 is a schematic diagram of a optical network constructed in accordance with the present disclosure.

Referring now to the drawings, and in particular to FIG. 1, shown therein is an exemplary embodiment of an optical mesh network 10 having at least a first node 14a as a head-end node and a second node 14b as a tail-end node, each with one or more transceiver system 18a-n, a multiplexer/demultiplexer 22, and an optical add/drop multiplexer (OADM) 26. In one embodiment, the OADM 26 may be a reconfigurable optical add/drop multiplexer (ROADM), or a fixed optical add/drop multiplexer (FOADM). Each of the one or more transceiver system 18a-n causes light to be transmitted at one or more distinct wavelength band and/or channel. Each node 14, such as the first node 14a and the second node 14b, are connected to at least one other node via a fiber optic cable 28. In at least one embodiment, the optical mesh network 10 may include at least one tap 30 before a node 14, such as a first tap 30a before the first node 14a and a second tap 30b before the second node 14b, and at least one control circuit 34 such as the first control circuit 34a connected to the first tap 30a and the one or more transceiver system 18a-n of the first node 14a and the second control circuit 34b connected to the second tap 30b and the one or more transceiver system 18a-n of the second node 14b. In one embodiment, the fiber optic cable 28 may form a path enabling the optical signal to pass through one or more span, one or more amplifier, and/or one or more ROADM. Each node 14 may further include an optical power monitor 32 (OPM) connected to the control circuit 34 and connected to the output of each transmitter system 18 and/or each node 14 such that the optical power monitor 32 can determine a power level of the output of each transmitter system 18 or node 14 respectively. FIG. 1 depicts only a first node 14a and a second node 14b for brevity. It is to be understood that one or more nodes may be intermediate to the first node 14a and the second node 14b.

In one embodiment, the OPM 32 is a device which can monitor the health of an optical channel. The OPM 32 can monitor the power levels for the range of the spectrum of the optical channel. The OPM 32 may be placed on a reconfigurable optical add drop multiplexer (ROADM) card where multiplexing of multiple optical channels is done to form a complete C/L-band and where optical power controls are run for each optical channel. The target power level of each transmission signal, either determined or assigned, may collectively be referred to as a target threshold.

Figure 2A:
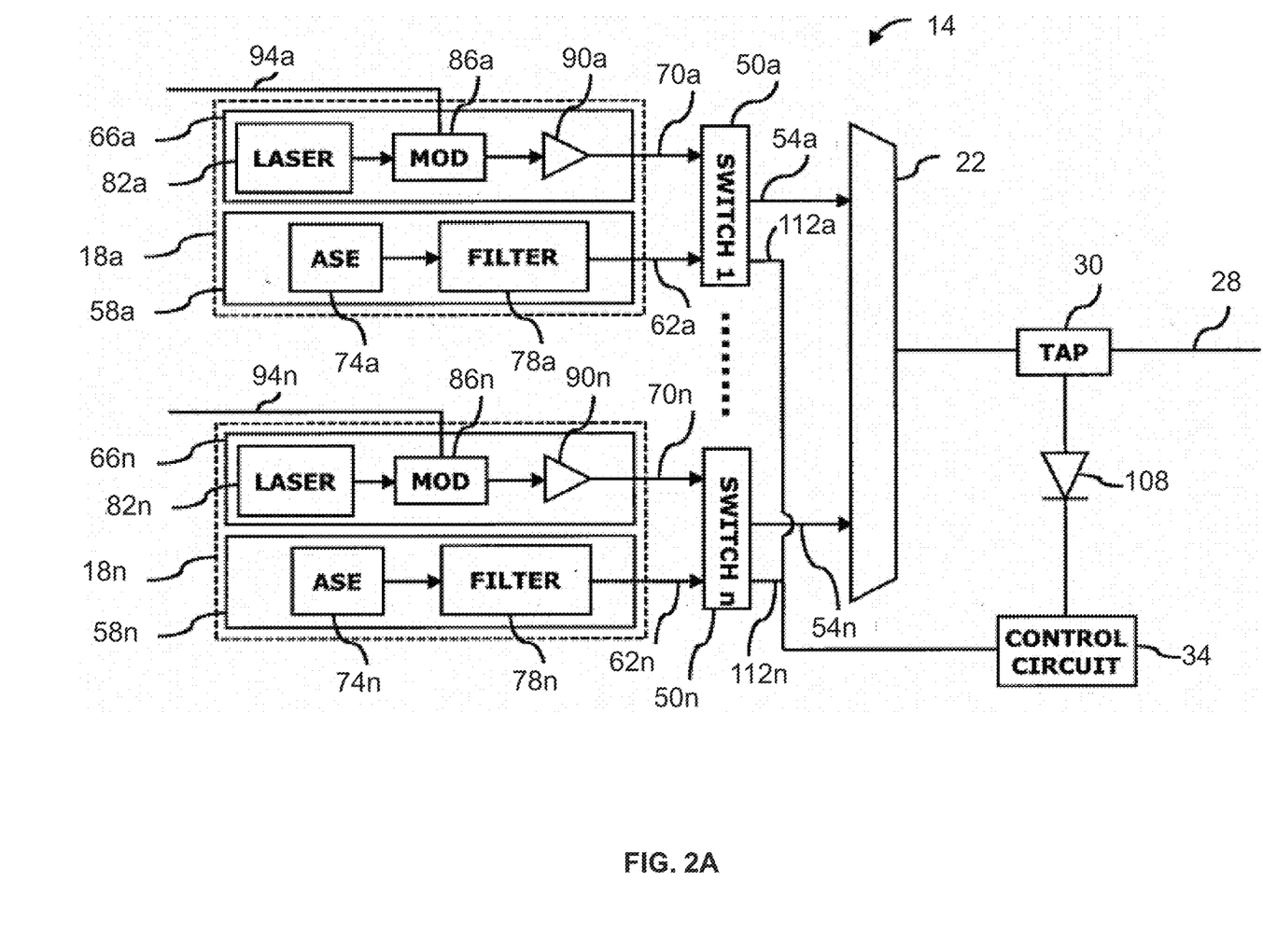
FIG. 2A is a block diagram of a node constructed in accordance with the present disclosure.

Referring now to FIG. 2A, shown therein is a schematic diagram of a physical layer of an optical interface of the node 14 constructed in accordance with at least one embodiment of the present disclosure. The node 14 includes a multiplexer 22 to produce the optical signal to be carried on the fiber optic cable 28. In this embodiment, the node 14 is provided with transmitter systems 18a-n having optical ports optically coupled with switches 50a-n. Switches 50a-n are optically coupled with input ports of multiplexer 22 through output optical cables 54a-n. The switches 50a-n receive filtered noise signals from one or more backup transmitters 58a-n carried on filter output optical cables 62a-n and optical signals from one or more transmitter 66a-n carried on transmitter optical cables 70a-n. Backup transmitters 58a-n include one or more ASE light sources 74a-n coupled through optical filters 78a-n to provide one or more predetermined spectral bands of light to filter output optical cables 62a-n. ASE light sources 74a-n may be any known broadband noise source. ASE light sources 74a-n may include an equalizer at the output so that the spectral power density of the optical noise signal is equal at every wavelength across the bandwidth of node 14. In one embodiment, the switches 50a-n are wavelength selective switches (WSS). In one embodiment, the switch 50 may be integrated into the transmitter system 18.

The one or more transmitter 66a-n is provided with at least one laser source 82a-n coupled through at least one modulator 86a-n to at least one amplifier 90a-n. Modulator 86a-n may be an electro-optical modulator of known type or an electro-acoustic modulator of known type. In either event, modulator 86a-n modulates the optical output signal from laser source 82a-n based on electrical information (e.g., a bit stream) on modulator control input line 94a-n. For example, a bit stream of data may be encoded into a return to zero electrical signal (RZ signal). In this example, a "one" is represented by 5 volts, and a "zero" is represented by 0 volts. Modulator 86a-n modulates the output from laser source 82*a-n* to be optically "off" when the modulation signal is a "zero" and optically "on" when the modulation signal is a "one."

A wavelength division multiplex system (a WDM system) is frequently used to achieve a high capacity network, but when initially installed, only one or a few of the wavelength division channels are used to transmit information signals. Further, at times one or more of the wavelength division channels may not transmit correctly or the information signal transmitters may be disabled. In such instances, node 14 provides a transmission signal that combines information signals from the transmitter 66*a-n* and filtered noise signals from the backup transmitter 58*a-n*. The information signals come from one or more transmitter 66*a-n* on utilized wavelength channels of node 14. At the same time, the filtered noise signals come from ASE light source 74*a-n* through optical filters 78*a-n* of the backup transmitter 58*a-n*. In one embodiment, the ASE light source 74*a-n* may be connected to the optical filter 78*a-n*. The optical filter 78*a-n* may be a tunable filter, e.g., the filter 78*a-n*, may be tuned and/or tunable to correspond to the wavelengths of information signals from transmitter 66*a-n* matched with the optical filter 78*a-n* in each transmitter system 18*a-n* so noise is not added to signals and/or channels from other transmitters. In another embodiment, the ASE light source 74*a-n* is connected directly to the switch 50*a-n* such that light produced by the ASE light source 74*a-n* does not pass through the filter 78*a-n* before entering the switch 50*a-n*.

When it is desired to add more information signals, appropriate transmitters 66*a-n* may be activated and switches 50*a-n* select the signal being transmitted through output optical cables 54*a-n* from the noise signals from the backup transmitters 58*a-n* to the information signal transmitted from the transmitters 66*a-n*. In this way, noise is not added to the desired information signals and all WDM channels are loaded.

Generally, when a disabled channel is ready to transmit an information signal again (i.e., when a damaged transmitter has been fixed), transmitter 66*a-n* begins to transmit an information signal and switch 50*a-n* changes the signal being sent through output optical cables 54*a-n* from the noise transmitted by the backup transmitter 58*a-n* to the information signal transmitted by the transmitter 66*a-n*. This process is described in more detail below.

To determine which WDM channels are currently being utilized and transmitting correctly, node 14 is provided with control circuit 34 connected to fiber optic cable 28 via a tap 30 and a photo diode 108. Control circuit 34 sends signals to switches 50*a-n* over connections 112*a-n* that determines which signal (information signals from the transmitter 66*a-n* or noise signals from the backup transmitter 58*a-n*) is sent through output optical cables 54*a-n* to the multiplexer 22. For instance, control circuit 34 may assess the signal transmitted through the fiber optic cable 28 and determine that an expected information signal is not being transmitted correctly (i.e., an expected signal is not present, such as a failed channel, or power has changed by more than a threshold amount, for example). This can be accomplished by comparing the current optical spectrum to a baseline optical spectrum. In such a case, the control circuit 34 may send a signal to the appropriate switch 50*a-n* associated with the expected information signal to select the output signal from the transmitter 66*a-n* to the backup transmitter 58*a-n* so that noise is transmitted in the appropriate spectrum while the problem is assessed and the wavelength fault can be rectified. When the problem is fixed (e.g., a damaged transmitter is fixed or replaced), the control circuit 34 sends a signal to the appropriate switch 50*a-n* to select the output signal from the noise signal transmitted by the backup transmitter 58*a-n* to the information signal transmitted by the transmitter 66*a-n*. In this way, control circuit 34 ensures that node 14 loads all WDM channels, even if some of the channels are loaded with noise. In one embodiment, one or more tap and photodiode may be optically coupled to the transmitter optical cable 70*a-n* and/or the filter output optical cable 62*a-n* thereby enabling the control circuit 34 to receive one or more signal from the photodiode indicating an output power level of the transmitter 66*a-n* and/or the backup transmitter 58*a-n* respectively. The control circuit 34 may determine that one or more of the transmitter 66*a-n* has been repaired based, at least in part, on the power level detected by the photodiode. In one embodiment, the OPM 32 may receive input from the one or more photodiode and send one or more signal to the control circuit 34 indicative of a repaired transmitter 66*a-n*. In one embodiment, the control circuit 34 may compare the power level to a threshold to determine whether an optical loss of signal is no longer present thus indicating the problem is repaired.

While each transmitter system 18*a-n* of node 14 has been shown having an ASE light source 74*a-n*, it should be noted that in another embodiment a single ASE light source (not shown) optically connected to filters 78*a-n* may be provided at node 14 that emits light across the desired spectrum (e.g., the C-Band). In such an embodiment, optical filter 78*a-n* take the full spectrum transmission and filter the spectrum to match the spectrum that would be transmitted by the transmitter 66*a-n* associated with the optical filter 78*a-n*.

One or more amplifiers (not shown) may also be provided to boost the intensity of optical signals from the one ASE light source 74*a-n* before the optical signal reaches optical filter 78*a-n*. The one or more amplifier may be of any type known in the industry such as erbium-doped fiber amplifiers (EDFA), for instance.

Figure 2B:
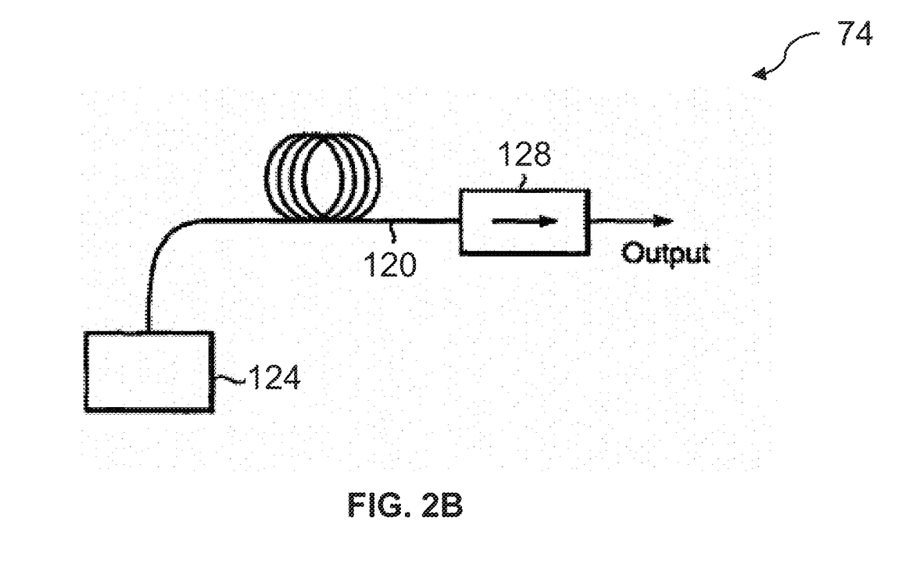
FIG. 2B is a block diagram of an exemplary ASE light source.

Shown in FIG. 2B is an exemplary ASE light source 74. The ASE light source 74 may be composed of an amplifying rare-earth doped optical fiber 120 Such as Er-doped fiber, a pumping Source 124, and an optical isolator 128. In this ASE light source 74, erbium ions doped in the amplifying optical fiber 120 are excited into a high energy level by pumping the light from the pumping Source 124, and then, emits ASE light in the wavelength band individual to the ion when the excited energy higher than the ground level is emitted. The isolator 128 prevents the ion excitation in the amplifier fiber from being made unstable by the returning light from the output end of the fiber. While the emitted ASE light from Er-doped amplifying fiber amplifier typically includes a wavelength band of 1530 to 1570 nm (1550 nm band), the fiber can emit a wavelength band of 1570 to 1610 nm as the fiber length is elongated 4 to 6 times as long as the usual fiber length. See Ono et al; "Amplifying Characteristics of 1.58 um Band Er"-Doped Optical Fibers Amplifier", Technical Report of Institute Of Electronics, Information and Communication Engineers, Japan, No. 5, pp. 25-29, 1997. In addition, 36 nm of a half-width of the ASE light has been achieved by a quartz Er-doped fiber (in a range of 1567 to 1604 nm), and 40 nm (1563 to 1603 nm) by a fluoride Er-doped fiber.

Figure 3:
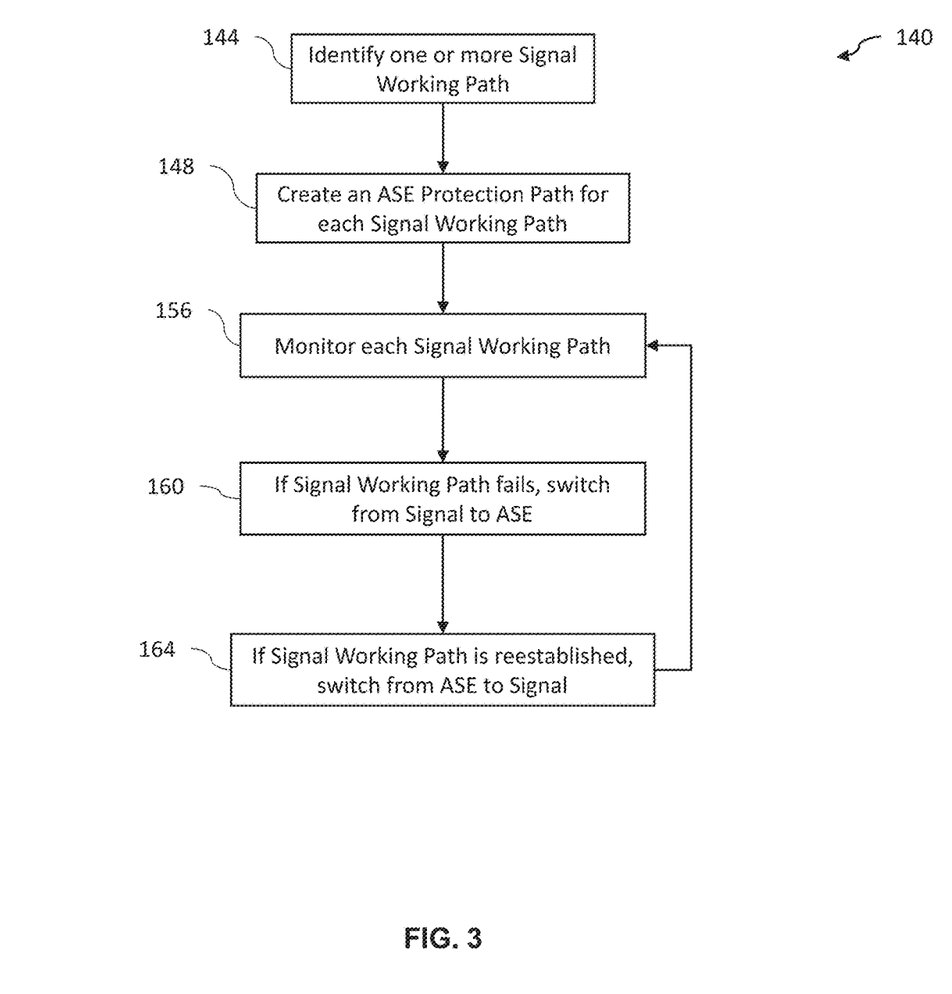
FIG. 3 is a logic flow diagram of an exemplary automated process constructed in accordance with the present disclosure.

Referring now to FIG. 3, shown therein is a process flow diagram of an exemplary embodiment of a signal protection process 140 generally comprising the steps of: identifying one or more signal working path (step 144), creating an ASE protection path for each signal working path (step 148), monitoring each signal working path (step 156), if the signal working path fails, switch from the signal working path to the ASE Protection path (step 160), and if the signal working path is re-established, switch from the ASE working path to the signal working path (step 164). In one embodiment, if the condition of step 160 and/or step 164 is met, the signal protection process 140 continues to step 156, monitoring each signal working path.

In one embodiment, identifying one or more signal working path (step 144) includes identifying a signal path of a transmission signal received on a first transceiver (e.g., the first node 14*a*) and sent through a second transceiver (e.g., the second node 14*b*). In one embodiment, the signal working path may be a signal path for a plurality of media channels, e.g., a superchannel, within the transmission signal. The signal working path may include one or more optical cross connect directing the transmission signal to a particular port of the first node 14*a* and/or the second node 14*b*. In one embodiment, a target power level of each transmission signal may be determined by the control circuit 34, system controller 200, or may be assigned by a user.

In one embodiment, creating an ASE protection path for each signal working path (step 148) includes, for each identified signal working path, calculating the power level of the transmission signal on a particular signal working path, determining properties for the ASE light source 74 and the filter 78 that, when the backup transmitter 58 is activated, would cause the backup transmitter 58 to transmit a filtered noise signal on the filter output optical cable 62 with a substantially similar power level for each channel in the transmission signal as the media channel of each transmission signal on a particular signal working path, and associating the ASE protection path with the particular signal working path. The ASE protection path may be directed or routed through the optical network with one or more optical cross connects. The particular signal working path and the associated ASE protection path may collectively be referred to herein as a protection group and be the same optical path through the optical network. In one embodiment, the properties for the ASE light source 74 and the filter 78 may be determined by an OPM scan of each of the signal paths. In one embodiment, the optical cross connect is integrated with a ROADM.

In one embodiment, monitoring each signal working path (step 156) may include monitoring a power of the transmission signal on the fiber optic cable 28 via the tap 30 and the photodiode 108 for the signal working path of each protection group. Monitoring may be performed by the control circuit 34. In one embodiment, monitoring includes measuring an output from the photodiode 108 to identify power levels of multiple channels on the transmission signal and comparing the power levels to the target threshold, which may be configured or system defined. The control circuit 34 identifies, at least, a failed working path as a particular signal working path that has a failure within one or more of the media channels, or, a reestablished working path if a failed working path has been reestablished, that is, if a failed working path no longer has a failure within one or more of the media channels. The collection of the one or more media channels no longer associated with the failure may be referred to as a correction set. In one embodiment, monitoring each signal working path (step 156) may be performed continuously or may be performed at discrete intervals of time. In one embodiment, a failure may include events such as a field replaceable unit, e.g. a ROADM or transmitter, (FRU) power loss or failure, cold resets, warm resets, hardware failure, and/or loss of cable continuity, for example.

In one embodiment, for each protection group, that is, for each pair of signal working path and ASE protection path, both paths may be assigned a state, such as "active", "standby", and "switchrequest". For example, if the signal working path has an active state, the ASE protection path may have a standby state and if the ASE protection path has the active state, the signal working path may have a standby state. Monitoring the signal working path may be performed by one or more OPM scan. In one embodiment, the OPM scan may determine a photodiode level optical loss of signal, that is a loss of signal based on measuring the photodiode 108 or the one or more photodiode monitoring the transmitter optical cables 70*a-n* and/or the filter output optical cable 62*a-n*. Generally, the photodiode level optical loss of signal may indicate a complete physical failure. In another embodiment, the OPM scan may determine a derived optical loss of signal. Such a derived optical loss of signal may provide finer granularity of losses, such as whether a particular media channel of one or more media channels on a particular signal path has failed.

In one embodiment, the control circuits 34*a* and 34*b*, for example, may be in communication with the system controller 200 (see FIG. 1). The control circuits 34*a* or 34*b* may transmit one or more node data to the system controller 200, such node data may include data captured by the photodiode 108, a failure notification if one or more signals fails, a node identifier, a timestamp, and the like and/or any combination thereof.

In one embodiment, if the signal working path fails, switching from the particular failed working path to the ASE protection path (step 160) may be performed by the control circuit 34*a* or 34*b*. To switch from the particular failed working path to the ASE protection path, the control circuit 34*a* or 34*b* may send a signal along one or more connections 112 to the switch 50 (see FIG. 2) to operatively enable the ASE protection path for the particular failed working path. In one embodiment, the control circuit 34 may soak the failures, that is, the control circuit 34 may wait for a predetermined amount of time, referred to as soak time, between first detecting a failure of the particular signal working path and switching from the particular signal working path to the ASE protection path. Soaking the failures may prevent switching when the failure is transient, and thus, temporary and/or of short duration. The soak time may be calculated by an algorithm or by a user.

In one embodiment, if the signal working path is reestablished, switching from the ASE protection path to the signal working path (step 164) may be performed by the control circuit 34*a* or 34*b*. To switch from the ASE protection path to the reestablished working path, the control circuit 34*a* or 34*b* may send a signal along one or more connections 112 to the switch 50 to operatively enable the signal working path for the particular reestablished working path.

In one embodiment, switching from the particular reestablished working path may be performed in steps of channels, or slices, in order to minimize sudden spikes in overall power levels. As discussed above, a sudden change in power levels may cause tilt, thereby resulting in data that is unreadable and/or corrupted. The channels, or slices, in the working path may be deactivated and the same channels, or slices, in the ASE protection path may be activated. An ASE attenuation profile may then be applied.

In one embodiment, an ASE-to-Working path switch process may include, for each reestablished working path, the following steps: The channels, or slices, in the ASE protection path may be deactivated and the same channels, or slices, in the reestablished working path may be activated. An ASE attenuation profile may then be applied.

In one embodiment, one or more step 144-164 of the protection group utilization process 140 may be stored as computer executable code in non-transitory memory that, when executed by a processor, causes the processor to perform one or more of the steps of the signal protection process 140. The control circuits 34a or 34b and/or the system controller 200 may be implemented on one or more computer system having, or in communication with, a non-transitory computer readable medium and at least one processor.

Figure 4:
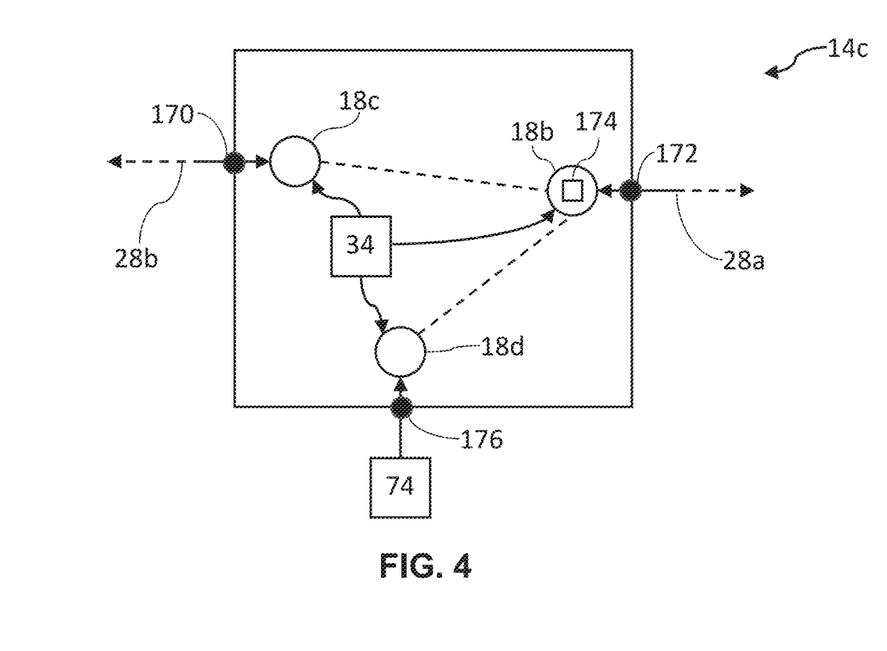
FIG. 4 is a diagrammatic view of a node constructed in accordance with the present disclosure.

Referring now to FIG. 4, shown therein is an exemplary embodiment of a node 14c having a first transmitter system 18b, a second transmitter system 18c, a third transmitter system 18d, a first fiber optic cable 28a and a second fiber optic cable 28b. The second transmitter system 18c may include a system port 170 that is connected to one or more transponder via the second fiber optic cable 28b. The first transmitter system 18b may include a line port 172 that is connected to another node by the first fiber optic cable 28a. As shown, a signal working path may be formed from one or more signal of one or more media channels entering the node 14c via the first fiber optic cable 28a at the first transmitter system 18b, continuing from the first transmitter system 18b to the second transmitter system 18c, and exiting the node 14c via the second fiber optic cable 28b. An ASE protection path may be formed from an ASE signal supplied by ASE light source 74 optically connected to, or alternatively contained within, the third transmitter system 18d. The first transmitter system 18b includes an optical cross-connect 174 for supplying the ASE light into the first fiber optical cable 28a.

In one embodiment, upon detection of a failure of one or more signal on the second fiber optic cable 28b connected to the second transmitter system 18c, the control circuit 34 may cause a switch 50 associated with the first transmitter system 18b to transmit the ASE signal received from the third transmitter system 18d. Detection of a failure may be performed at any transmitter system 18 receiving a signal, for example, at the second transmitter system 18c. The control circuit 34, by activating the switch 50 associated with the second transmitter system 18c will cause the ASE signal from the backup transmitter 58 to follow the ASE protection path such that the ASE signal replaces the one or more failed signal within one or more media channels, thereby ensuring that the power levels of the remaining media channels are not subjected to power level spikes or transients, thus mitigating any impact of losing the failed signal on the remaining media channels. In one embodiment, the first transmitter system 18b includes the line port 172 connected, via a line system fiber, to another node, the second transmitter system 18c includes the system port 170 connected to one or more transponders, and the third transmitter system 18d includes an ASE port 176 optically connected to the ASE light source 74.

Figure 5:
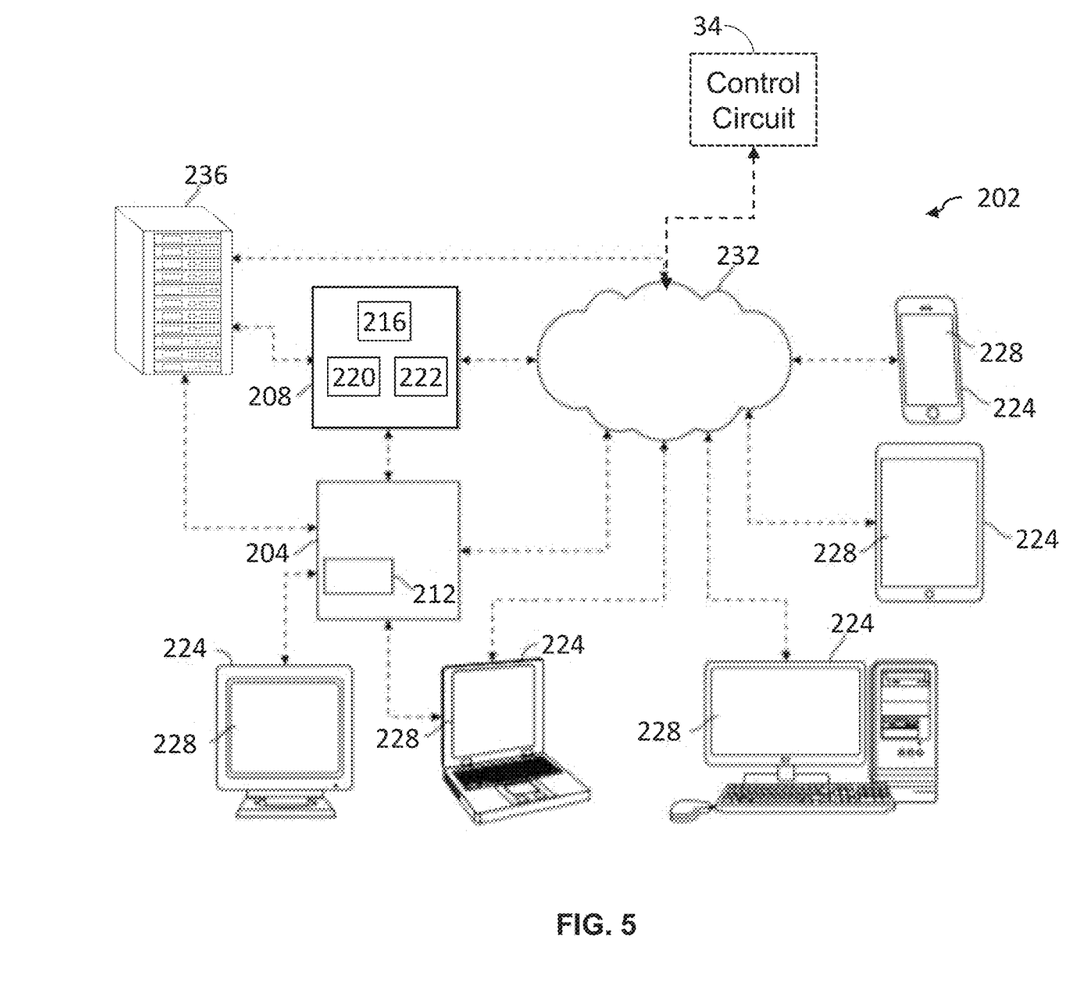
FIG. 5 is a diagram of an exemplary embodiment of a computer system implementing the present disclosure.

Referring now to FIG. 5, shown therein is a computer system 202 in accordance with the present disclosure designed to carry out the protection group utilization process 140. The protection group utilization process 140 may be carried out on one or more computer system 202. The computer system 202 may comprise one or more processor 204, one or more non-transitory computer-readable storage medium 208, and one or more communication component 212. The one or more non-transitory computer-readable storage medium 208 may store one or more database 216, program logic 220, and computer executable instructions 222. The computer system 200 may bi-directionally communicate with a plurality of user devices 224, which may or may not have one or more screens 228, and/or may communicate via a network 232. The processor 204 or multiple processors 204 may or may not necessarily be located in a single physical location. The one or more user devices 224 may enable a user to interface with the one or more control circuits 34.

In one embodiment, the non-transitory computer-readable medium 208 stores program logic, for example, a set of instructions capable of being executed by the one or more processor 204, that when executed by the one or more processor 204 causes the one or more processor 204 to carry out the protection group utilization process 140 or some portion thereof.

In one embodiment, the network 232 is the Internet and the user devices 224 interface with the system via the communication component 212 and a series of web pages. It should be noted, however, that the network 232 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

In one embodiment, the computer system 202 comprises a server system 236 having one or more servers 236 in a configuration suitable to provide a commercial computer-based business system such as a commercial web-site and/or data center. The server system 236 may be connected to the network 232.

The computer system 202 may be the system controller 200 and may be in communication with the one or more control circuit 34. The computer system 200 may be connected to the one or more control circuit 34 through the network 232, however, the network 232 may not be the Internet in all embodiments. In one embodiment, the computer system 202 is an element of a field replaceable unit, or FRU.

Figure 6:
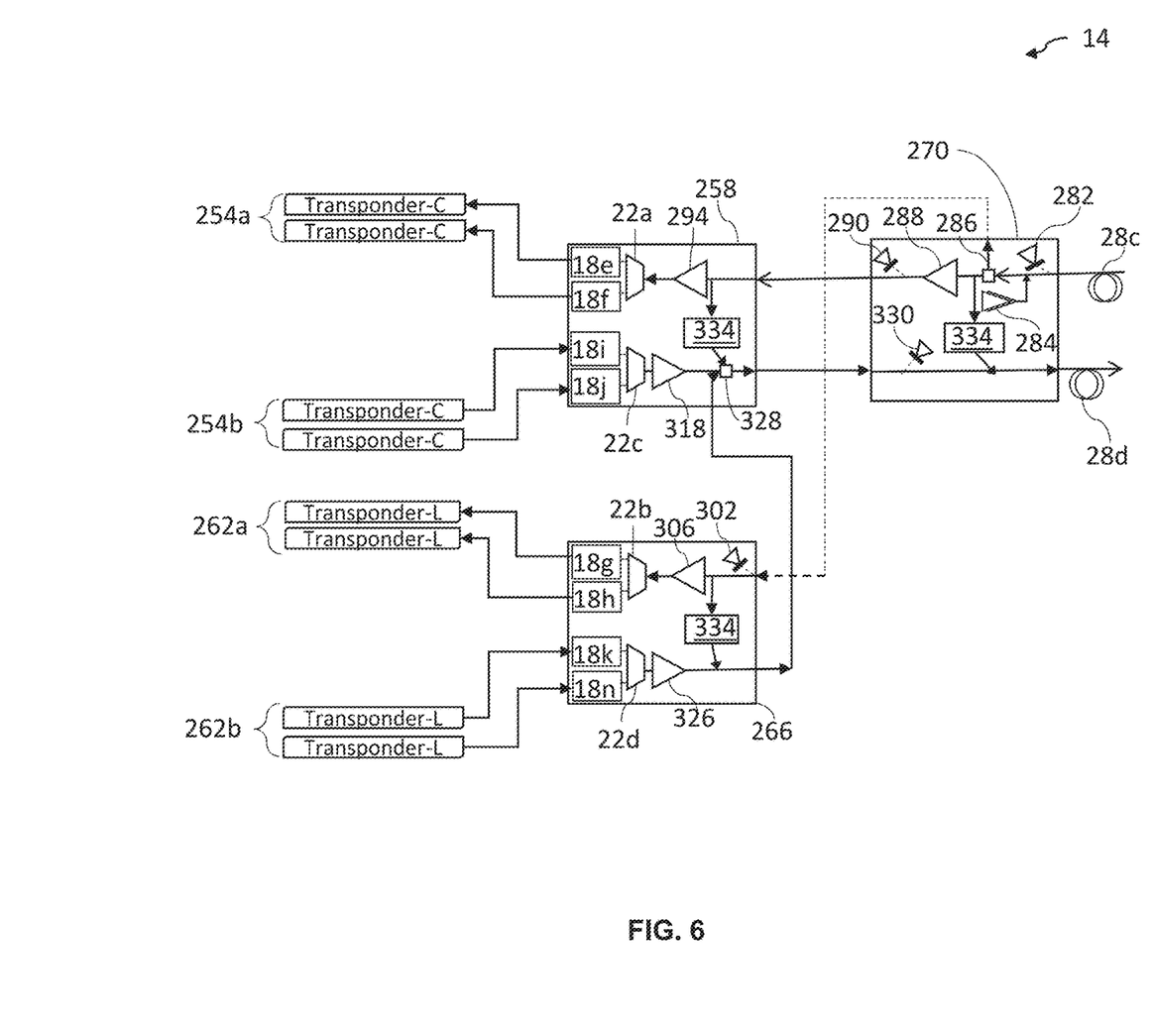
FIG. 6 is a schematic diagram of an exemplary node constructed in accordance with the present disclosure.

Referring now to FIG. 6, shown therein is a block diagram of an exemplary node 14 which may be used to implement the first node 14a and/or the second node 14b. The node 14 has a plurality of C-Band transponders 254, including receivers 254a and transmitters 254b, connected to a C-Band ROADM 258 and a plurality of L-Band transponders 262, including receivers 262a and transmitters 262b, connected to an L-Band ROADM 266, the C-Band ROADM 258 and the L-Band ROADM 266 are coupled together and connected to a hybrid C-Band card 270. The hybrid C-Band card 270 is connected to a third fiber optic cable 28c having a first transmission signal traveling in a first direction and connected to a fourth fiber optic cable 28d having a second transmission signal traveling in a second direction different from the first direction. Each of the C-Band transponders 254 and the L-Band transponders 262 is connected to one port of the node 14. Only four ports are depicted in FIG. 6 for simplicity. It is understood that the number of ports in each node 14 may vary depending on hardware used, each installed FRU, capacity requirements, and technology limitations, and therefore the node 14 may also have more than or less than four ports.

The first transmission signal traveling in the first direction enters the hybrid C-Band card 270, is detected by a first photodiode 282 via a tap (not shown) and enters a diverter 286 where a C-Band portion of the first transmission signal passes through an amplifier 288, is detected by a second photodiode 290 receiving the first transmission signal via a tap (not shown), enters the C-Band ROADM 258, is amplified by an amplifier 294, and is then demultiplexed by demultiplexer 22a before traveling to transmitter system 18e and transmitter system 18f, then traveling to receivers 254a of the C-Band transponders 254, and where an L-Band portion of the first transmission signal enters the L-Band ROADM 266, is detected by a third photodiode 302 via a tap (not shown), is amplified by an amplifier 306, and is then demultiplexed by demultiplexer 22b before traveling to transmitter system 18g and transmitter system 18h, the traveling to receivers 262a of the L-Band transponders 262. A raman pump laser 284 supplies optical signal into the first transmission signal.

The C-Band portion of the second transmission signal traveling in the second direction originates at transmitters 254b of the C-Band transponders 254, enters the transmitter system 18i and 18j, is multiplexed by multiplexer 22c before being boosted by an erbium-doped fiber amplifier 318. The L-Band portion of the second transmission signal traveling in the second direction originates at transmitters 262b of the L-Band transponders 262, enters the transmitter system 18k and transmitter system 18n, is multiplexed by a multiplexer 22d before being encoded by the erbium-doped fiber amplifiers 326. The C-Band portion and the L-Band portion are then combined in combiner 328 to form the second transmission signal that is detected by a fourth photodiode 330 via a tap (not shown) and which further passes through the hybrid C-Band card 270 to the second fiber optic line 278.

In other embodiments, the node 14 may not include the Hybrid C-Band card 270. Additionally, while receivers 254a and transmitters 254b are shown independently, each transponder 254 is comprised of a transmitter 254b and a receiver 254a. The transponder 254 is diagramed as two elements, the receiver 254a and the transmitter 254b, for simplicity of the diagram. Similarly, while receivers 262a and transmitters 262b are shown independently, each transponder 262 is comprised of the transmitter 262b and the receiver 262a. The transponder 262 is diagramed as two elements, the receiver 262a and the transmitter 262b, for simplicity of the diagram. Alternatively, the receivers 254a may be integrated into the transmitter system 18e and transmitter system 18f and the transmitters 254b may be integrated into the transmitter systems 18i and 18j. Similarly, the receivers 262a may be integrated into the transmitter system 18g and transmitter system 18h and the transmitters 262b may be integrated into the transmitter systems 18k and 18n. Each of the C-Band ROADM 258, the L-Band ROADM 266, and the hybrid C-Band card 270 may each have an optical supervisory channel 334.

In one embodiment, by monitoring the transmission signal detected by each of the first photodiode 282, the second photodiode 290, the third photodiode 302, and/or the fourth photodiode 330, the control circuit 34 may identify a failed signal working path. Communication between different elements on the node 14 and the control circuit 34 may be enabled by the optical supervisory channel 334. The control circuit 34 may communicate one or more failure to the system controller 200. Additional photodiodes may be placed such that detection of a failure at a particular element may be determined. In another embodiment, identifying a failed signal working path is performed by receiving a failure notification on the optical supervisory channel. Additionally, it should be noted that even though the node 14 is depicted for a C-Band and an L-Band transmission signal, the bands depicted are not limiting and a similar construction can be used for any band of a transmission signal in a fiber optic network. Additionally, the failures can be detected by monitoring the OPM scanned data of the provisioned media channels.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A method comprising the steps of:
receiving a signal indicative of a failure of a first channel within a plurality of channels of a transmission signal traversing a signal working path in a network, the signal working path having a headend node, a tail-end node and an intermediate node, the first channel being a failed channel, the channels having the failed channel and an operational channel, the failed channel having a frequency band and a power level prior to failing, the operational channel having encoded data, the signal working path being associated with a protection path, the protection path including the intermediate node, an optical cross-connect, and a transmitter supplying amplified spontaneous emission (ASE) light;
activating the transmitter to supply the ASE light, the ASE light being within a frequency band and having a power level corresponding to the frequency band and power level associated with the failed channel; and
supplying the ASE light to the cross-connect, such that the cross-connect provides a transmission signal including the ASE light.

2. The method of claim 1, further comprising the steps of:
reestablishing the signal working path, the signal working path being devoid of the failed channel,
disabling the transmitter from supplying the ASE light.

3. The method of claim 2, wherein disabling the transmitter from supplying ASE light is performed subsequent to reestablishing the signal working path.

4. The method of claim 1, wherein activating the transmitter is performed a predetermined soak time after the signal is received.

5. The method of claim 4, wherein the predetermined soak time is set by a user.

6. The method of claim 1, wherein the ASE protection path is associated with a status comprising one or more of active status, standby status, and switchrequest status.

7. The method of claim 1, wherein the signal working path is associated with a status comprising one or more of active status, standby status, and switchrequest status.

8. The method of claim 1, wherein an optical power monitor monitors a power level of the signal working path in the network.

9. The method of claim 8, wherein the signal indicative of the failure of the failed channel within the plurality of channels of the transmission signal is based at least in part on the power level of the signal working path in the network.

10. The method of claim 1, wherein the signal indicative of the failure of the failed channel is an optical loss of signal.

* * * * *